United States Patent Office 3,555,736
Patented Jan. 19, 1971

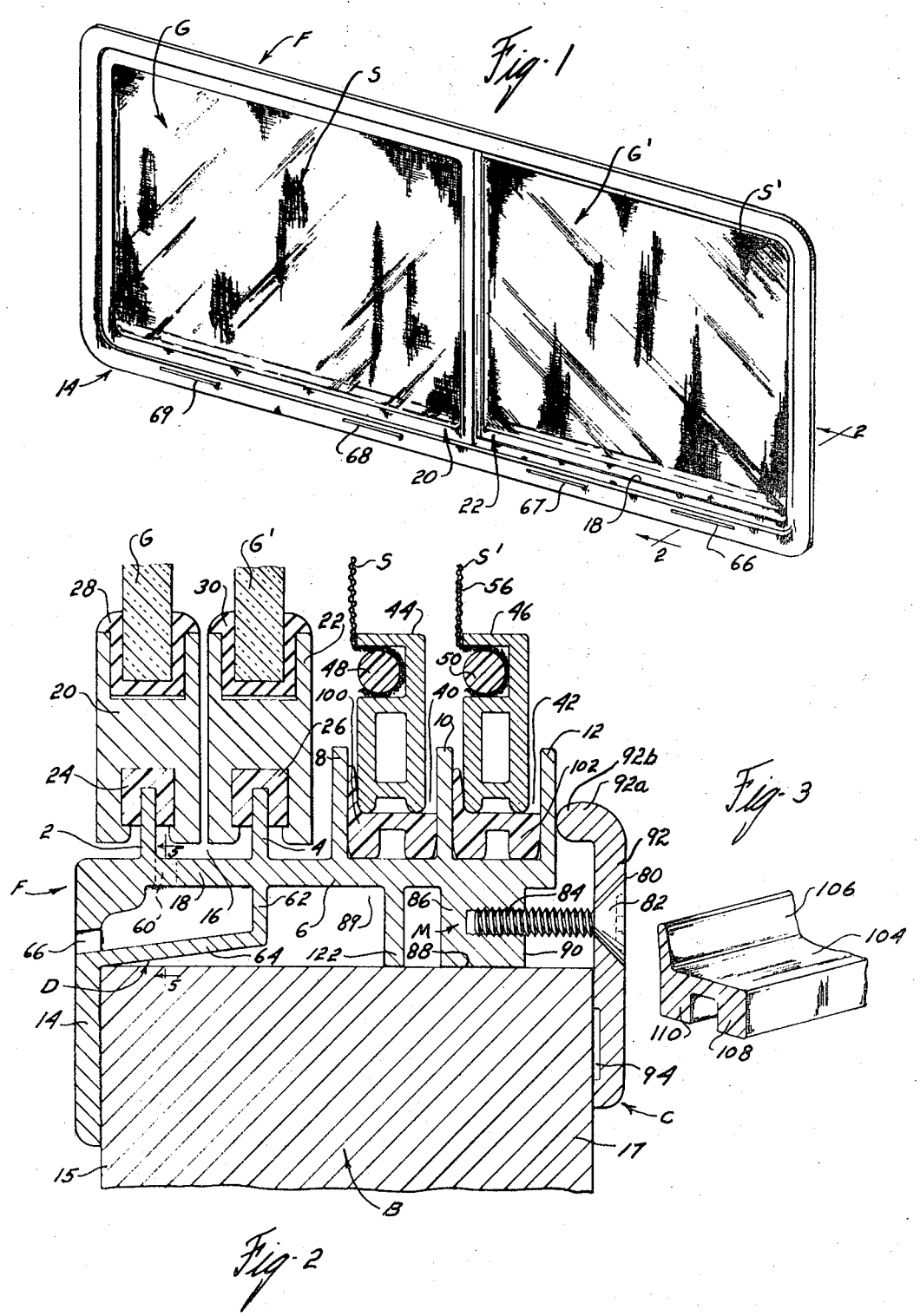

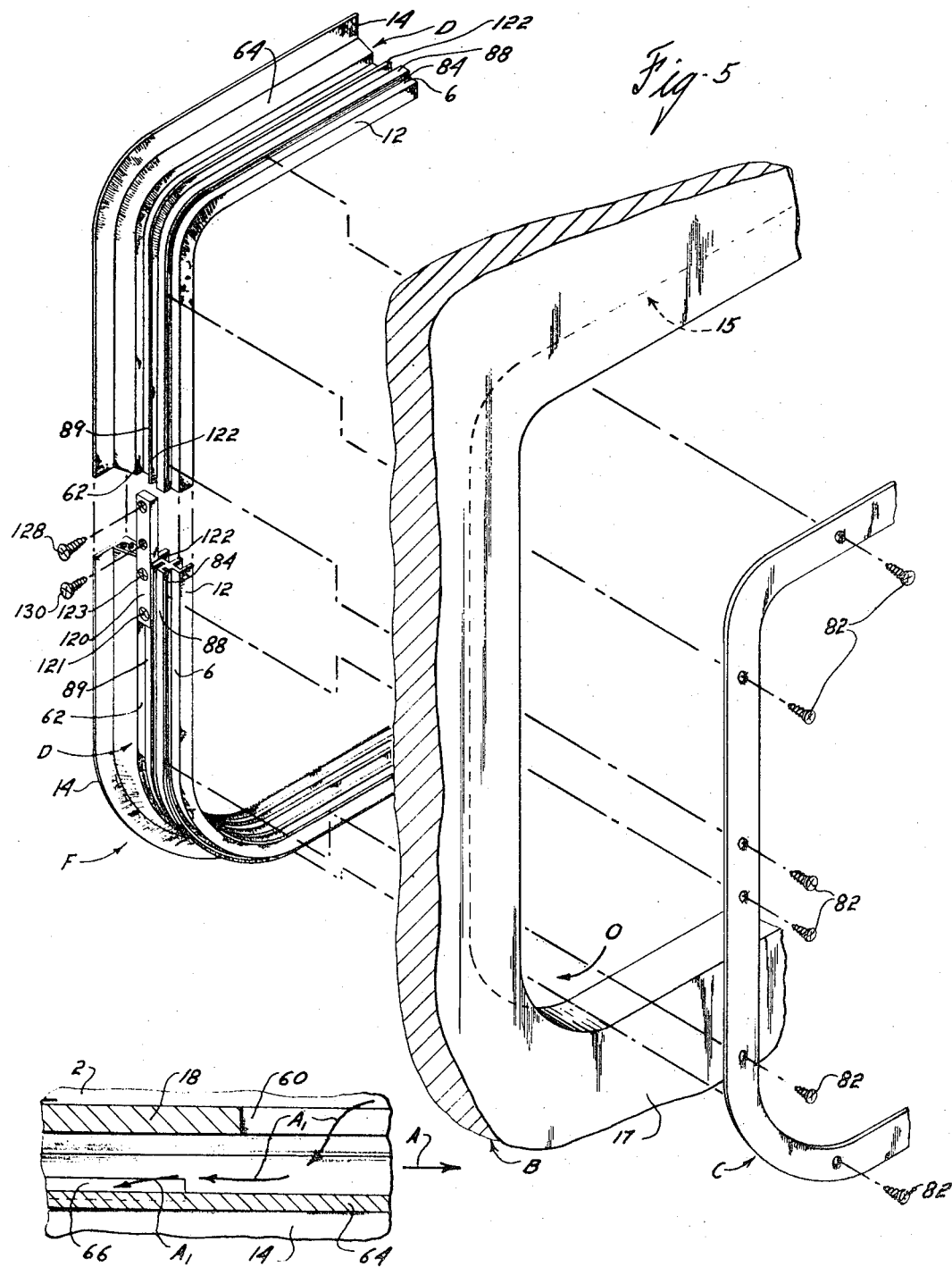

3,555,736
FRAME ASSEMBLY
Charles H. Koch, Jr., Glenside, and Norman M. McGinnis, Philadelphia, Pa., assignors to Young Windows, Inc., Conshohocken, Pa., a corporation of Pennsylvania
Continuation of application Ser. No. 700,266, Jan. 24, 1968. This application June 23, 1969, Ser. No. 835,596
Int. Cl. E06b 1/14, 1/68, 7/12
U.S. Cl. 49—504           2 Claims

ABSTRACT OF THE DISCLOSURE

A vehicle frame assembly for holding slidable glass and screen housing members is provided with improved means for disposing of water which accumulates in the frame channel that is exposed to the atmosphere. The floor of the channel is provided with a water runoff slot beneath which there is positioned a duct for receiving water flowing through the slot. The duct has a bottom wall which is inclined downwardly toward the exterior side of the frame so that water will drain from the duct through an opening provided in said exterior side. There is also described a clamp or trim which is L-shaped in crosssection and which is attached directly to the frame. The clamp functions to hold the frame in the body of the vehicle in a manner such that it is unnecessary to insert fastening elements in the body itself.

---

This invention relates to an improved frame assembly and one that is particularly suited for holding glass pane and screen housing members in the body of a vehicle.

This application is a continuation of our co-pending application, Ser. No. 700,266 filed Jan. 24, 1968, and entitled Frame Assembly and now abandoned.

It is known to provide vehicles, such as for example, buses and trailers, with prefabricated frame assemblies which are installed into openings in the body of the vehicle and affixed thereto, and which function to hold slidable subframe or housing members which carry glass panes and/or screens. In one such type of assembly the base of the frame is provided with a plurality of flanges which form tracks that accommodate subframe or housing members that are slidable to and fro in the frame. The flanges, together with the base of the frame, form open channels, one of which is located on the frame's exterior side and in which there tends to accumulate water, the source of which may be rain or melting snow. Water accumulation in the channel is extremely undesirable because it tends to seep into the interior of the vehicle or into the space between the inner and outer walls of the vehicle body. Such seeping is aggravated when the vehicle is making a turn or is positioned on an incline.

A number of frame designs have been proposed to cope with the problem of water accumulation in the exterior frame channel, but for one reason or another, they have inherent disadvantages. For example, in one such design, the frame extends beyond and projects outwardly from the exterior side of the vehicle body. At least part of the exterior channel is located on said projecting frame portion and the floor of this part of the channel is provided with an opening through which water in the channel drains. Such design, while effective in ridding the channel of water, has the disadvantage that it can increase the overall width of the vehicle. From an aesthetic standpoint, the projecting frame is not in keeping with the streamlined design of today's modern vehicles.

It is also known to attach prefabricated frame assemblies to the body of a vehicle by fastening elements, such as screws or bolts, which are inserted directly into the body of the vehicle. This method of affixing the frame to the body has various disadvantages, not the least of which is that installation time is prolonged because of the necessity of having to drill the body with the holes into which the fastening elements are inserted.

In accordance with this invention, a frame or frame section having an exterior side and track means, adjacent said exterior side, forming a frame part, for example an open channel, in which water tends to accumulate is provided with a water runoff opening in the region of the channel and water receiving means for receiving water flowing through the runoff opening and a drain opening in the exterior side for allowing water to drain from the receiving means. In its preferred embodiment described hereinafter in detail, the channel of the frame in which water tends to accumulate is provided with a water runoff opening which opens into a duct underlying the channel, which duct has an inclined bottom for receiving the water from the runoff opening. The water flows down the inclined bottom and out of the duct through a drain opening that is provided in the side wall of the frame. With this invention, frame assemblies are provided so that the exterior of the frame is substantially flush with the exterior of the body carrying the frame end, as such, the frame does not extend or project outwardly to any great extent from the body.

There is also provided in accordance with this invention, a clamp or clamp section which can be utilized in a manner such that it is unnecessary to attach the frame directly to the body carrying the frame by inserting fastening elements into the body. For this purpose the clamp is provided with a first part in position for contact with a side wall of the frame, a second part in position for contact with the side of the body carrying the frame and a part intermediate said first and second parts adaptable for receiving means accommodating fastening means for attaching the clamp directly to the frame. In its preferred embodiment, described hereinafter in detail, the clamp is L-shaped in cross section and has a leg in position for contact with a side wall of the frame, a first part in position for contact with the side of the body carrying the frame and a second part intermediate said leg and said first part adaptable to receive means accommodating a fastening element, such as for example, a screw hole, with the fastening element being attached directly to the frame. Cooperating with the clamp to hold the frame in the body carrying it, is a clamp attachment member projecting from the base of the frame.

The preferred embodiment of the invention is described in detail hereinafter in connection wth accompanyng drawngs wherein:

FIG. 1 is an isometric view of the exterior of a frame assembly of this invention carrying window and screen housing members in closed position;

FIG. 2 is a cross-sectional view taken on the line 2—2 of FIG. 1 with all housing members shown in alignment for purposes of clarity;

FIG. 3 is a projected cross section of a runner or guideway which can be used in the frame assembly of this invention;

FIG. 4 is a sectional view taken on the line 5—5 of FIG. 2; and

FIG. 5 is an exploded isometric view of a frame assembly of this invention and a portion of a frame carrying body member.

In FIG. 1 there is shown the exterior side of a frame assembly, i.e., the side that is located on the outside of the vehicle body. The frame F carries glass housing members 20 and 22 in which are positioned glass panes G and G' respectively. The frame F also carries screen housing members 44 and 46 (see FIG. 2) in which are positioned screens S and S' respectively.

The assembly F is adapted to fit into a wall opening in the enclosure with which the windows are to be used. For example, with reference to FIG. 5, the wall or body B has an opening O dimensioned to accept the frame in a manner as indicated in FIG. 2.

With reference to FIG. 2, which clearly shows the details of the frame and the housing members which it carries, the frame F, preferably made of a metal such as aluminum, has flanges 2 and 4 protruding from the base 6. The flanges 2 and 4 are tracks on which the glass housing members 20 and 22 respectively, are positioned for slidable to and fro movement in the frame. For this purpose, the glass housing members 20 and 22 are grooved and provided with strips of rubber or felt lacing 24 and 26 respectively, which receive the flanges 2 and 4 respectively. The glass housings 20 and 22 are also provided with weather strips 28 and 30 which also function to hold tightly the glass panes G and G' in their respective housing members.

The base 6 of the frame F is further provided with flanges 8, 10 and 12 which form tracks or channels 40 and 42 in which are positioned respectively screen housing members 44 and 46, for slidable to and fro movement. The rubber retainers 48 and 50 tightly hold screens S and S' in their respective housing members.

The remaining details of construction of the glass and screen housing members are not described because they form no part of this invention and are well known.

Tightly wedged into the tracks 40 and 42 are runners or guideways 100 and 102 respectively. The runners function to provide a surface on which the screen housing members can slide easily and are the subject of the patent application entitled, "Runner or Guideway" of Charles H. Koch, Jr., filed simultaneously herewith, and the disclosure of which is incorporated herein by reference.

The runner, also shown in FIG. 3, is made from a flexible material, such as for example, polyethylene, and includes a runway 104 for receiving the screen housing member, a tapered back 106 which projects upwardly from the runway and is inclined outwardly therefrom, a front leg 108 and a rear leg 110. The runner is designed so that it can be easily inserted under hand pressure into the track or channel of the frame, but once inserted, is wedged therein and will not slip out under ordinary conditions of use. For this purpose, the angle of inclination of the back 106, the width of the runway 104 and positioning of the front and rear legs 108 and 110 respectively are interrelated with the width of the channel so that the runner is wedged therein, due to the frictional engagement of the outer surfaces of the back and rear leg with a side wall of the channel, and to the frictional engagement of the outer surface of the front leg with the other side wall of the channel.

Turning again to FIG. 2, the flange 2, positioned adjacent the exterior side of the frame forms the open channel 16 with the adjacent flange 4 and part of the frame base 6. A portion of this channel, as can be seen from FIG. 1, will be exposed to the atmosphere and as a consequence, water will tend to accumulate in it during inclement weather. The frame is provided with means to dispose of such water. Thus, the channel floor 18 has a water runoff slot 60 to allow water to drain from the channel. Water flowing through the slot 60 enters the duct which underlies the base 6 and the runoff slot 60. The duct is formed by part of the base 6, the bottom wall 64, the side wall 62 which extends from the underside of the base 6, and a portion of the exterior side or rim 14 of the frame. The walls 62 and 64 constitute a drain wall. As water enters the duct through the runoff slot 60, it is received by the bottom wall 64 which is inclined or sloped downwardly toward the exterior side or rim 14. The water drains out of the duct and away from the frame through the drain slot 66 in the side wall 14.

It will be appreciated that water tends to accumulate only in the channel at the bottom of the frame and not in the channels at the sides or top of the frame. Consequently, only the underside of the base of the bottom part of the frame need be provided with the duct D. However, because the preferred method of making the frame is by extrusion of straight frame sections which are bent according to known techniques into the desired frame shape, the duct generally will be coextensive with the frame perimeter. This can be better seen in FIG. 5.

In general, the channel floor 18 should be provided with water runoff slots sufficient in number so that the water quickly drains from the channel. Likewise, the exterior side of the frame should be provided with a sufficient number of drain slots for quick draining of the water in the duct. In FIG. 1, it can be seen that the exterior side or rim 14 of the frame is provided with four drain slots 66–69 to quickly rid the channel of water nel floor 18 (not shown in FIG. 1) cooperate with the drain slots 66–69 to quickly rid the channel of water accumulating therein.

In order to drain the duct D of water flowing therein through the opening in the channel floor, it is only necessary that the duct be provided with a drain opening to which the water has access. However, it has been found that for most efficient drainage and problem-free functioning the positioning of the opening in the channel floor relative to the positioning of the drain opening in the duct is important.

For example, it has been found that if the runoff slot of the channel and the drain slot of the duct are in line with each other, or if they overlap, they tend to produce a whistling sound when the vehicle is in motion. In order to avoid the whistling sound, the runoff slot 60 and the drain slot 66 should be offset from each other, at least to the extent they do not overlap, as shown clearly, for example, in FIG. 4. However, it is noted that the distance between the offset slots should be relatively short, so that the water flowing into the duct from the runoff slot 60 will not have to travel a distant path to drain through the drain slot. This makes for more efficient drainage.

With respect to such positioning of the slots or openings, the term "offset" when used herein and in the claims means that the runoff slot or opening and the drain slot or opening are positioned in their respective members so that an imaginary vertical plane passing perpendicularly through the frame and an end of one of the slots or openings will not intersect any portion of the other slot or opening and so that the other slot or opening will be completely on the opposite side of the plane, with its end a relatively short distance therefrom.

Another aspect of efficient drainage is the selective positioning of the runoff and drain slots relative to the direction in which the vehicle generally travels. It has been found that with respect to the drain slot, the runoff slot should be positioned in the floor channel in a leading position relative to the direction in which the vehicle generally travels. The reason for this is that as the vehicle is in motion, the air moving past its body and in the opposite direction of vehicle movement will tend to suck the water out of the duct through the drain slot. FIG. 4 illustrates this, with arrow A indicating the direction of movement of the vehicle and arrows $A_1$ indicating the path of travel of the water from runoff slot 60 to drain slot 66.

On the other hand, if the drain slot were in the leading position relative to the general direction of travel of the vehicle, with the runoff slot being positioned to the rear of the drain slot, the air flow past the side of the vehicle body would tend to deter the water flow through the drain slot.

Attention is now directed to the means by which the frame is held in the body of the vehicle or other frame carrying body. With reference to FIG. 2, the clamp C, also seen in FIG. 5, is attached to the frame F by the screw 82 positioned in the hole 80 of the clamp. The screw 82 is received in the grooved passage or slot 84 of the clamp attachment member M projecting from the base 6 of the frame. The attachment member M comprises an exterior side wall 86, a bottom wall 88 and an interior side wall 90 which is provided with the grooved passage 84.

As can be appreciated from FIG. 5, the clamp attachment member M can be coextensive with the frame perimeter and the clamp can be fastened to the frame by a plurality of screws 82, each of which is received in the grooved passage 84.

The clamp C, L-shaped in cross section, has a leg 92a projecting foot 92a for contact with the frame's interior side formed by the flange 12. The foot of the clamp, by virtue of the round edge 92b, can function as a pivoting surface for the clamp in situations where the body thickness varies to some extent or is somewhat irregular in shape. By so functioning the frame can be securely and tightly held in the body without regard to such irregularities in shape or thickness.

The part of the clamp that is in contact with the interior side or wall 17 of the body B is provided with a cut-out portion 94. The purpose of the cut-out portion is to provide a clearance space for the heads of screws which can be inserted into the interior side of the body, prior to the positioning of the clamp, and which are utilized for the purpose of attaching to the body a rod member for holding the bottom of hanging draperies or other window coverings against the body. Such rod members and their method of attachment to the vehicle body are well known, form no part of this invention and consequently are not shown herein.

The clamp, which can also serve as an attractive trim strip for the vehicle interior, can be of any suitable material, but is preferably aluminum. The clamp can be made by extruding straight sections which are bent into the desired shape according to known techniques. The entirety of the clamp can be made up of one section which has been bent into its desired shape with the ends thereof held in mated contact by screws inserted adjacent their ends and into the clamp attachment member of the frame. On the other hand, the clamp can be made up of two or more sections with the ends of the various sections held in mating contact by screws inserted adjacent their ends and into the frame's clamp attachment member.

The holding of the frame in its body as described herein has a number of extremely desirable features. For example, the frame can be affixed in the body opening without the need of having to insert any frame fastening elements into the body itself. Thus, the installer of the frame need not spend time in drilling into the body holes for receiving fastening elements. The clamp described herein, in addition to holding the frame in the body, can also function as an attractive trim strip for the interior of the body. The clamp's design also functions to accommodate irregularities in shape or thickness of the body. It is further noted that the frame can be attached to the body in a manner such that the use of fastening elements on the exterior side of the frame or body can be completely avoided, thereby making for an attractive, streamlined exterior appearance and precluding unlawful access to the interior of the body by the simple expediency of removing frame fastening elements from the exterior of the body.

Turning now to the installation of the frame assembly into the body member, it is first noted, as mentioned above, that the preferred method of making the metal frame is by extruding straight sections thereof according to known techniques and then bending the sections into the desired shape of the frame. Although in some applications the entirety of the frame will consist of one section bent into the desired shape with the ends thereof attached together, in general the frame will be made up of two or more sections with the ends of the various sections attached together. Reference is made to FIG. 5 which illustrates how the ends of the frame or frame sections can be attached. The attachment bar 120 is first attached to one end of the frame or frame section by the screws 121 and 123. When attaching the bar 120, it can be conveniently held in its desired position in the channel 89 formed by the flange 122 and the duct side wall 62 in which channel it fits snugly. After so attaching the bar, the other end of the frame or frame section can be moved into position to receive the bar in the corresponding channel, and the bar is attached to this end of the frame by the screws 128 and 130.

It is noted that when the frame has a width so narrow that it has no room to accommodate a channel, such as channel 89, the attachment bar can be inserted into the duct D and fastened to the frame by screws inserted from the side of the frame that accommodates the housing members before said members are inserted into the frame assembly.

Other methods can, of course, be utilized to attach the ends of the frame or frame sections together, but the one described above has been found to be functionally sound and economical for the type of frame shown.

When the completed frame is set in the opening of the body B and with reference to FIGS. 2 and 5, the clamp C is attached thereto by screwing the screws 82 into the grooved passage 84. As the screws engage the grooved passage 84, the exterior side 14 of the frame is drawn tightly against the exterior side 15 of the body, the leg 92 of the clamp exerts pressure on the flange 12, and the part of the clamp in contact with the interior side 17 of the body is tightly held thereagainst. Thus, the frame is tightly and securely held in the body without the necessity of screwing or attaching fastening elements to the body itself and of providing the body with means for receiving the fastening elements.

The means described herein for disposing of water which accumulates in the frame assembly and for clamping the frame in the body are not limited to use in the exact type frame shown. Thus, the invention can be utilized in frames which have a different number of tracks and which hold a different number of housing members than that shown, and in even different types of frames, such as for example, those which are designed to hold canopy type housing members. Also, the frame assembly is not limited to use in vehicles, but can be used, too, in static bodies.

We claim:

1. A frame assembly for window means, the frame being adapted to fit into a wall opening in an enclosure with which the window means is to be used, the frame comprising:
   a base;
   a first flange adjacent one edge of the base and extending normal thereto, the flange being for use in engaging and overlying the outside wall of the enclosure when the frame is mounted in the opening;
   a second flange adjacent the opposite edge of the base and extending normally thereto in a direction opposite to first said flange;
   a pair of spaced apart flanges extending normal to the base in the same direction as said second flange, each spaced apart flange forming a track for use in mounting a window and the space between said spaced apart flanges forming a channel to accept portions of a window and to receive water running off a window;
   a drain wall underlying said channel, the wall extending between said base and said first flange;
   a slot in said base open to said channel and open to said drain wall and permitting water to run from the channel to the drain wall;
   a slot in said first flange located adjacent the drain wall and open to the exterior of the enclosure and open to said drain wall and permitting water on the drain wall to run to the exterior;

an attachment flange adjacent said second flange and extending away from the base in a direction opposite to said second flange, the attachment flange being engaged with the wall when the frame is mounted in the opening;

a groove in said attachment flange;

a clamp for clamping the frame in the opening including a portion to engage said second flange and a portion to engage the inside wall of the enclosure;

screw means operative, when the clamp is positioned to secure the frame, to extend through the clamp and thread into said groove and cause the clamp to bear tightly on the second flange and to bear tightly on said inside wall and thereby pull the first flange tightly against said outside wall.

2. A frame assembly for window means, the frame being adapted to fit into a wall opening in an enclosure with which the window means is to be used, the frame comprising:

a base;

a first flange adjacent one edge of the base and extending normal thereto, the flange being for use in engaging and overlying the outside wall of the enclosure when the frame is mounted in the opening;

a pair of spaced apart flanges extending normal to the base, each spaced apart flange forming a track for use in mounting window means and the space between said spaced apart flanges forming a channel to accept portions of said window means and to receive water running off said window means;

a drain wall underlying said channel, the wall extending between said base and said first flange;

a slot in said base open to said channel and open to said drain wall;

a slot in said first flange located adjacent the drain wall and open to the exterior of the enclosure and open to said drain wall and permitting water on the drain wall to run to the exterior;

an L-shaped clamp having a leg and a foot for clamping the frame in the opening, the edge of the foot of the clamp being round and engaging said base and the leg of the clamp engaging the inside wall of the enclosure, said round edge providing a pivoting surface for the clamp to move to accommodate irregularities of said enclosure; and fastening means operative, when the clamp is positioned to secure the frame, to extend through the leg of the clamp and into said base and cause the clamp to tightly interengage with the base and to bear tightly on said inside wall and thereby to pull the first flange tightly against said outside wall.

References Cited

UNITED STATES PATENTS

| | | | |
|---|---|---|---|
| 2,672,959 | 3/1954 | Young | 52—212 |
| 2,787,034 | 4/1957 | Hauck | 52—209 |
| 2,911,688 | 11/1959 | Osten | 49—408 |
| 2,922,675 | 1/1960 | Wernig | 52—209 |
| 3,147,518 | 9/1964 | Horgan | 52—476 |

FOREIGN PATENTS

| | | | |
|---|---|---|---|
| 949,700 | 1964 | Great Britain | 52—209 |

HENRY C. SUTHERLAND, Primary Examiner

U.S. Cl. X.R.

52—208, 209, 303